Patented Oct. 6, 1931

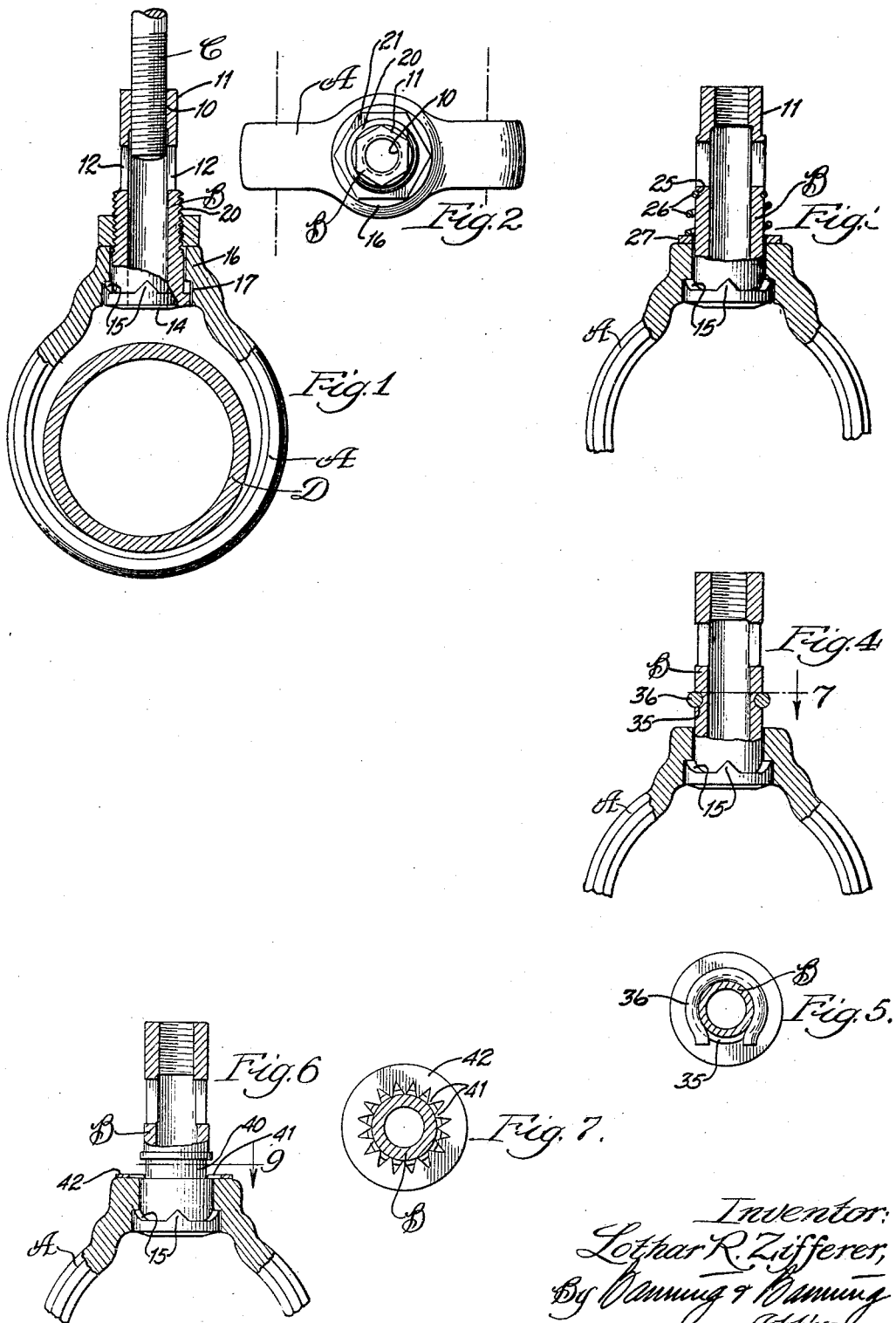

1,825,842

UNITED STATES PATENT OFFICE

LOTHAR R. ZIFFERER, OF COLUMBIA, PENNSYLVANIA; MABEL C. ZIFFERER, HARRY E. CHAMPION, AND H. NELSON ALBRIGHT, EXECUTORS OF SAID LOTHAR R. ZIFFERER, DECEASED, ASSIGNORS TO COLUMBIA MALLEABLE CASTINGS CORPORATION, OF COLUMBIA, PENNSYLVANIA, A CORPORATION OF NEW YORK

PIPE HANGER

Application filed May 27, 1930. Serial No. 456,016.

This invention relates to a pipe hanger which is adjustable upon a depending overhead support. It comprises a ring having a swiveled mounting upon a sleeve, there being means by which these two parts may be inseparably connected. The present invention is directed more particularly to the connection between the sleeve and ring by which these parts tend to remain in a relatively fixed rotative position, although freely rotatable after the one has been shifted longitudinally upon the other; and to the means by which such a connection is rendered inseparable, or substantially so.

Certain suggestive embodiments of this invention are set forth in the accompanying drawings wherein—

Figure 1 is a view partly in elevation, and partly in longitudinal section, of the hanger in its entirety, showing a pipe in transverse section supported by the hanger;

Fig. 2 is a top plan view of the hanger shown in Fig. 1;

Fig. 3 which is a fragmentary view, shows a hanger having a modified form of connection by which to retain the ring and sleeve against disassembly;

Fig. 4 which is a similar view shows a still further modification;

Fig. 5 is a transverse section on line 7 of Fig. 4;

Fig. 6 which is also a fragmentary view shows one more modification of the invention; and Fig. 7 is a transverse section therethrough on line 9 of Fig. 6.

The pipe hanger herein shown comprises a ring A having a swiveled connection with a sleeve B the internal threads 10 of which cooperate with a depending bolt C having an overhead fastening. By rotating the sleeve the hanger may be adjusted vertically upon the bolt. A device of this character is adapted to support a pipe D which is receivable within the ring A, as shown.

The sleeve is provided by preference with a polygonal head 11 affording a convenient wrench hold. It may also have one or more transverse apertures 12 affording a view of the supporting bolt C which is threaded therewithin. At the lower end of the sleeve is a head 14 having upwardly facing teeth 15, as shown.

The ring is formed with a collar 16 on its upper side. Through this collar is formed a radial opening for the insertion of the sleeve the head of which is receivable within a seat at its inner end. Formed in this seat are teeth 17 cooperating with the teeth 15 of the sleeve head whereby to resist rotation of the ring relative to the sleeve. The hanger parts, i. e., the ring and sleeve, may conveniently be formed of metal which is cast. The sleeve is readily insertable through the collar opening for assembly with the ring. It is, desired, however, that some means be provided by which to retain the sleeve in such assembled relation, and it is largely with the provision of a stop means, spaced from the head 14, that the present invention is concerned. The description to follow suggests several different ways of accomplishing this end.

Referring to Figs. 1 and 2, the sleeve portion above the head is shown to be exteriorly threaded as at 20 for the reception of a nut 21 which is adjustable to a desired position longitudinally of the sleeve. Initially this nut is left in a threaded position somewhat remote from the sleeve head, permitting the sleeve to shift longitudinally within the ring collar. With the parts so related, the sleeve may be turned upon the supporting bolt C to a desired position of adjustment without a corresponding movement of the ring in which a pipe is carried. After the correct vertical adjustment is made, the nut is then screwed down against the collar end, as shown in Fig. 1, whereby to lock the sleeve against longitudinal movement relative to the ring. In such a position, the coacting teeth 15 and 17 will oppose rotative movement of either hanger part relative to the other.

In the construction of Fig. 3, the sleeve exterior is provided with an annular groove as at 25 to receive an end coil of a spring 26 whose opposite end bears against the collar end or against a washer 27 which lies adjacent thereto. In this manner the spring is immovably secured to the sleeve whose toothed head is resiliently maintained against the collar seat, so that rotation of the sleeve is normally prevented.

In Fig. 4 I have shown a construction somewhat similar to that of Fig. 3 in that the sleeve is provided with an annular groove 35 in which may be seated a split ring 36 forming a stop spaced from the sleeve head for limiting shifting movements of the sleeve within the ring collar. The stop ring which is applied to the sleeve after the latter is assembled within the ring will ordinarily remain permanently in place thereupon.

In the construction of Figs. 6 and 7 the sleeve is provided with an elongated groove 40. Lying within this groove are teeth 41 inwardly extended from a flat ring 42 adapted to rest upon the collar end. These teeth are sufficiently flexible to give when the ring is forced along the periphery of the sleeve until reaching the groove 40 where they may straighten out to the position shown in Fig. 6. By such means I provide a lock which permits of a limited longitudinal movement of the sleeve relative to the hanger ring.

In each of the constructions herein shown and described, the sleeve is provided with means applicable thereto by which to engage with the ring collar to prevent disassembly of the sleeve from the ring. In one longitudinal position the interengageable teeth are clear of each other, so that rotation of the sleeve relative to the ring may proceed freely. In the other extreme longitudinal position the cooperating teeth interengage to resist such rotative movements. Due to the vertical position of the hanger, and also to the weight of the load supported therein, the cooperating teeth will normally remain interengaged so as to prevent rotation of the sleeve relative to the ring. This normal tendency may be augmented, however, as by the adjustable stop of Fig. 1, or the resilient stop of Fig. 3.

The various constructions which I have shown and described are typical of many which may be employed for the same purpose, and hence I do not intend to be limited to any of the particular forms shown except as specified in the claims following:

I claim:

1. In a pipe hanger having a collared pipe receiving ring, a supporting sleeve for said ring having a stop at one end adapted to cooperate with one side of the collar of said ring, locking means on said stop adapted to cooperate with said collar to normally resist rotation of the collar and sleeve, and detachable means spaced from said stop to provide for limited sliding movement of said ring for releasing said locking means.

2. A pipe hanger in which is comprised a ring having a collar wherein is fitted a sleeve having a head with means engaging other means on the collar for resisting relative rotation between the sleeve and collar when the former is in one endwise position relative to the latter, and a spring coiled around the sleeve having one end confined against endwise movement thereupon and its other end exerting a thrust against the collar whereby to maintain the sleeve normally in the above noted longitudinal position relative to the collar.

3. A pipe hanger in which is comprised a ring having a collar wherein is fitted a sleeve having a head with means engaging other means on the collar for resisting relative rotation between the sleeve and collar when the former is in one endwise position relative to the latter, and a spring associated with the one part exerting a thrust against the other part whereby to maintain the sleeve normally in the above noted longitudinal position relative to the collar.

4. A pipe hanger in which is comprised a ring having a collar wherein is fitted a sleeve having a head with elements engageable with other elements on the collar for normally resisting rotation of the sleeve relative to the collar, there being a circumferential groove exteriorly of the sleeve, and a ring having flexible teeth adapted, when straightened, to project into the groove, the ring cooperating with the shoulders at one end of the groove to limit the longitudinal shifting movements of the sleeve in one direction.

In testimony whereof, I have hereunto set my hand May, 1930.

LOTHAR R. ZIFFERER.